Dec. 15, 1925.
P. I. BIBLE
NUT LOCK
Filed Aug. 22, 1925
1,565,250
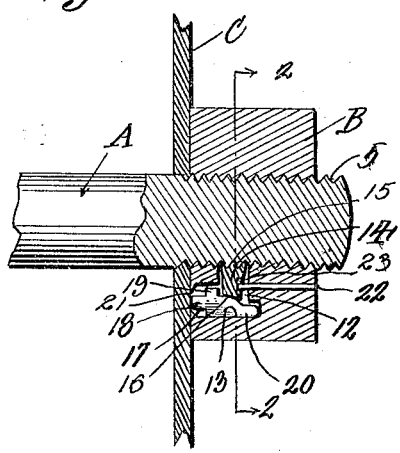
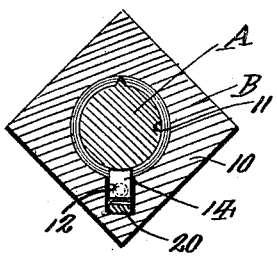
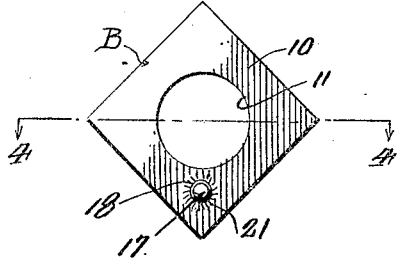
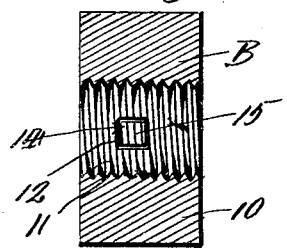
WITNESSES
PAUL I. BIBLE, Inventor
By Richard B. Owen, Attorney Patented Dec. 15, 1925.

1,565,250

UNITED STATES PATENT OFFICE.

PAUL I. BIBLE, OF HOLLIS, OKLAHOMA.

NUT LOCK.

Application filed August 22, 1925. Serial No. 51,770.

*To all whom it may concern:*

Be it known that I, PAUL I. BIBLE, a citizen of the United States, residing at Hollis, in the county of Harmon and State of Oklahoma, have invented certain new and useful Improvements in Nut Locks, of which the following is a specification.

This invention relates to novel means for locking a nut on its bolt against accidental retrograde movement and the primary object of the invention is to provide novel means associated with the nut for biting contact with the shank of the bolt, when the nut has been threaded into intimate contact with the work.

Another object of the invention is the provision of a novel locking lug carried directly by the nut and arranged in a radially extending opening communicating with the bore thereof and having teeth thereon for gripping the shank of the bolt, and a novel slidably mounted operating lug adapted to be forced into contact with the locking lug when the nut is threaded into contact with the work for forcing the locking lug in gripping contact with the bolt, whereby unthreading of the nut will be prevented, thereby effectively eliminating accidents contingent with the accidental unthreading of nuts off of their bolts.

A still further object of the invention is to provide a novel nut lock of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings;

Figure 1 is a longitudinal section through the nut lock showing the nut in contact with the work and the same locked on the bolt, Figure 2 is a section taken on the line 2—2 of Figure 1 looking in the direction of the arrows, showing the locking means in operative locking position on the shank of the bolt, Figure 3 is a bottom plan view of the nut, and Figure 4 is a section through the same taken on the line 4—4 of Figure 3 looking in the direction of the arrows, illustrating the position of the locking lug relative to the bore of the nut.

Referring to the drawings in detail, wherein similar reference characters designate corresponding parts throughout the several views, the letter A generally indicates a bolt, B a nut and C the work, engaged by the nut.

The bolt A can be of any conventional construction, and the outer end thereof is provided with the usual threads 5.

The nut B embodies the usual body 10 having the axially threaded bore 11 for receiving the threaded shank of the bolt A and in accordance with this invention the body 10 of the nut is provided with a radially extending opening 12 which communicates with the bore. A passageway 13 is formed in the body of the bolt parallel with the bore 11 and communicates with the radially extending passageway 12 and the passageway 13 opens out through the inner end of the nut as clearly shown in Figures 1 and 3 of the drawings.

Slidably mounted within the radially extending passageway 12 is a locking lug 14 the inner end of which is provided with biting teeth 15 for engaging the threads by the bolt A, as will be hereinafter more fully described. The inner end of the locking lug 14 is provided with a beveled face 16 which is adapted to be engaged by the operating lug 17, which is slidably mounted within the passageway 13. The operating lug 17 is provided with a reduced extension 18 which is normally adapted to extend beyond the inner face of the nut. This reduced extension 18 defines the shoulders 19 for a purpose, which will be hereinafter more fully described. The inner edge of the operating lug 17 is cut away to define an inwardly extending tongue 20 which normally engages the inner end of the locking lug 14 and it is to be noted that this face is inclined and that the inner edge of the operating lug is gradually inclined toward the tongue 20 so as to facilitate the riding of the locking lug up on to the body portion of the said operating lug, for forcing the locking lug into gripping contact with the bolt. As stated the reduced portion 18 of the operating lug is adapted to normally extend beyond the inner face of the nut B and after the locking lug and the operating lug are placed in position in the nut, the inner face of the nut is crimped, as at 21 about the operating lug so as to reduce the sides thereof and thus prevent the displacement of said operating lug from the passageway 13. I prefer to use a pin 22 extending into the nut body for holding the locking lug in connection with the operating lug in place and it is to be noted that the edge of the locking lug is provided with a notch 23 which receives the said pin. The notch is of a sufficient size to allow movement of the locking lug in engagement with the threads of the bolt.

In use of the improved lock nut the nut B is threaded on the shank of the bolt in the usual manner, and as the reduced portion 18 of the operating lug comes into engagement with the work, the same will be gradually forced inward and owing to the inclined surface thereof will force the locking lug into biting contact with the threads of the bolt and thus prevent retrograde movement of the nut.

Changes in details may be made without departing from the spirit or scope of this invention, but:

What I claim as new is:

1. The combination with a bolt having a threaded shank of a nut threaded upon the shank adapted to engage the work through which the bolt is inserted, the nut having a radially extending passageway formed therein opening out into the bore of the nut, and a second passageway arranged parallel with the bore of the nut communicating with the inner end of the radially extending passageway and opening out through the inner face of the nut, an operating lug slidably mounted within the second mentioned passageway having a reduced tongue and a reduced extension normally extending beyond the inner face of the nut, a locking lug slidably mounted within the radially extending bore having a beveled inner end normally resting upon the tongue and biting teeth on its outer end for engaging the threads of the bolt, a holding pin extending into the nut for engaging the locking lug for holding the same against displacement, and an inclined face leading from said tongue to the body portion of the operating lug for engaging the beveled face of the locking lug for normally urging the same outwardly into locking contact with the bolt, when the operating lug is forced inwardly by the engagement thereof with the work.

2. As a new article of manufacture, a lock nut having a body provided with an axially threaded bore and a radially extending passageway communicating with the bore and a second passageway arranged parallel with the bore and communicating with the inner end of the radially extending passageway and opening out through the inner face of the nut, a locking lug slidably mounted within the radially extended passageway having a recess in one edge thereof, a pin carried by the nut fitted within the recess to prevent displacement of the locking lug through the radially extending passageway into the bore, an operating lug slidably mounted within the second passageway having a tongue normally engaging the inner end of the locking lug, a reduced extension formed on the outer end of the operating lug normally extending beyond the inner face of the nut, the inner face of the nut being crimped about the radially extending passageway to limit the outward movement of the operating lug in the vertically extending passageway and an inclined operating face formed on the operating lug for forcing the locking lug in biting contact with a bolt, when the nut is moved into engagement with the work.

3. The combination with a bolt having a threaded shank, of a nut threaded upon the shank adapted to engage the work through which the bolt is inserted, the nut having a radially extending passageway formed therein opening out into the bore of the nut and a second passageway arranged parallel with the bore of the nut communicating with the inner end of the radially extending passageway and opening out through the inner face of the nut, an operating lug slidably mounted within the second mentioned passageway having a reduced tongue and a reduced section normally extending beyond the inner face of the nut, a locking lug slidably mounted within the radially extending bore having a beveled inner end normally resting upon the tongue and biting teeth on its outer end for engaging the threads of the bolt, and an inclined face leading from said tongue to the body portion of the operating lug for engaging the beveled face of the locking lug for normally urging the same outwardly into the locking contact with the bolt, when the operating lug is forced inwardly by the engagement thereof with the work.

In testimony whereof I affix my signature.

PAUL I. BIBLE.